(12) United States Patent
Ono et al.

(10) Patent No.: US 11,221,587 B2
(45) Date of Patent: Jan. 11, 2022

(54) IMAGE FORMING APPARATUS AND METHOD FOR REDUCING AIRBORNE PARTICLES

(71) Applicant: Hewlett-Packard Development Company, L.P., Spring, TX (US)

(72) Inventors: Manabu Ono, Yokohama (JP); Takashi Nakazawa, Yokohama (JP); Takeshi Kawamura, Yokohama (JP)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/256,718

(22) PCT Filed: Jul. 12, 2019

(86) PCT No.: PCT/US2019/041581
§ 371 (c)(1),
(2) Date: Dec. 29, 2020

(87) PCT Pub. No.: WO2020/036699
PCT Pub. Date: Feb. 20, 2020

(65) Prior Publication Data
US 2021/0255583 A1 Aug. 19, 2021

(30) Foreign Application Priority Data
Aug. 13, 2018 (JP) .............................. JP2018-152184

(51) Int. Cl.
*G03G 21/00* (2006.01)
*G03G 21/20* (2006.01)
(Continued)

(52) U.S. Cl.
CPC ........... *G03G 21/206* (2013.01); *B01D 45/08* (2013.01); *G03G 15/2017* (2013.01); *G03G 15/2039* (2013.01); *G03G 2221/1645* (2013.01)

(58) Field of Classification Search
CPC ............. G03G 21/206; G03G 21/0052; G03G 2221/1645; B01D 45/08; B01D 45/10;
(Continued)

(56) References Cited

U.S. PATENT DOCUMENTS

| 1,678,844 A | 7/1928 | Bradshaw |
| 4,132,192 A | 1/1979 | Weyers et al. |

(Continued)

FOREIGN PATENT DOCUMENTS

| JP | 2014-235246 A | 12/2014 | |
| JP | 2017-120283 A | 7/2017 | |
| WO | WO-2020091782 A1 * | 5/2020 | ........... G03G 21/206 |

*Primary Examiner* — Robert B Beatty
(74) *Attorney, Agent, or Firm* — Jefferson IP Law, LLP

(57) ABSTRACT

An image forming apparatus has an airborne particle reduction structure located in an airflow passage and including a first L-shaped baffle and a second L-shaped baffle. The first L-shaped baffle and the second L-shaped baffle each include an overhang extending from a bent portion to a first end and a wind receiver extending from the bent portion to a second end. Additionally, the first end of the first L-shaped baffle and the first end of the second L-shaped baffle are both oriented toward an upstream position of the airflow passage. The second end of the first L-shaped baffle is attached to a first airflow surface of the airflow passage, and the second end of the second L-shaped baffle is attached to a second airflow surface opposing the first airflow surface and located downstream from the first L-shaped baffle.

19 Claims, 6 Drawing Sheets

(51) Int. Cl.
*B01D 45/08* (2006.01)
*G03G 15/20* (2006.01)

(58) Field of Classification Search
CPC ...... B65H 5/228; B65H 29/24; B65H 29/247; B65H 2301/4461; B65H 2801/03; B65H 2801/06
USPC .......................................................... 399/92
See application file for complete search history.

(56) References Cited

U.S. PATENT DOCUMENTS

| | | |
|---|---|---|
| 4,583,112 A | 4/1986 | Morano et al. |
| 8,478,156 B2 | 7/2013 | Shimoyama et al. |
| 8,554,103 B2 | 10/2013 | Oomoto et al. |
| 8,923,723 B2 | 12/2014 | Hirakawa et al. |
| 9,291,996 B2 | 3/2016 | Nakano et al. |
| 2003/0164560 A1* | 9/2003 | Okuda .................... B01D 47/18 261/90 |
| 2004/0069243 A1 | 4/2004 | Ishiguro et al. |
| 2007/0065171 A1* | 3/2007 | Koshimura ........ G03G 15/0942 399/99 |
| 2012/0141173 A1* | 6/2012 | Iwasaki .............. G03G 15/2025 399/327 |
| 2014/0056608 A1 | 2/2014 | Miura |
| 2014/0321878 A1* | 10/2014 | Kondo ................ B41J 2/17563 399/93 |
| 2015/0258494 A1* | 9/2015 | Kai .................... B01D 53/8631 422/180 |
| 2016/0288035 A1* | 10/2016 | Pereira ................... B01D 45/08 |
| 2017/0036149 A1* | 2/2017 | Barley .................. B01D 45/08 |
| 2018/0088499 A1* | 3/2018 | Inada ................... G03G 15/5041 |
| 2019/0078515 A1* | 3/2019 | Atsuchi .................. F02C 7/052 |

* cited by examiner

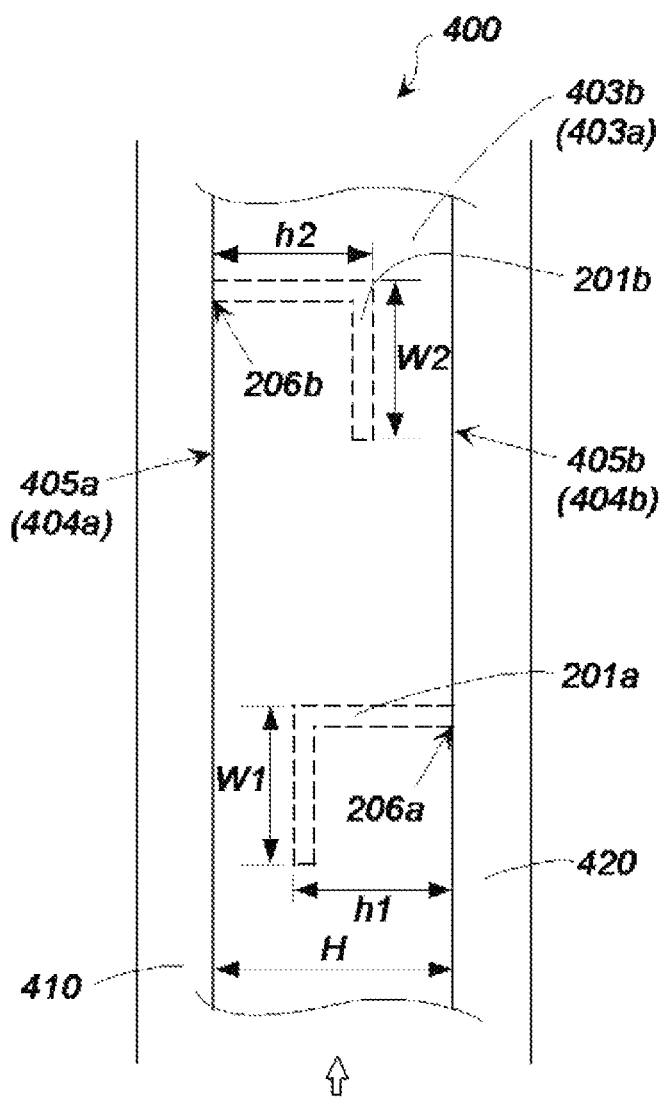
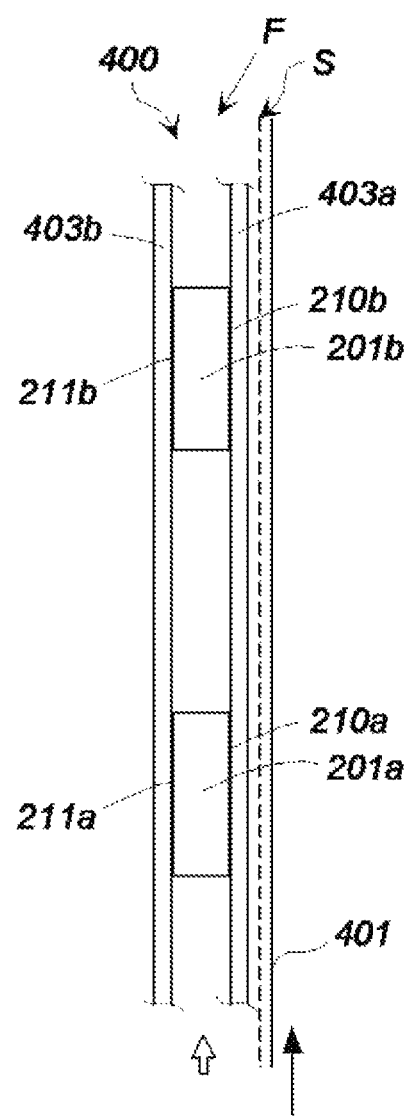
Fig.4(a)
Fig.4(b)

IMAGE FORMING APPARATUS AND METHOD FOR REDUCING AIRBORNE PARTICLES

BACKGROUND

Some image forming apparatuses may have a structure to exhaust, with an exhaust fan or the like, heat generated in the image forming apparatus to the outside of the apparatus, for stabilizing the formation of images. Because of this, airborne particles generated in the image forming apparatus due to developer or the like (i.e., particulate matters having a particle size of 30 to 300 nm, also termed UFP (Ultra Fine Particles)) are apt to be scattered outside the apparatus during heat exhaustion, potentially influencing the quality of indoor air around the image forming apparatus.

BRIEF DESCRIPTION OF THE DRAWINGS

FIG. 4 is a front view and a side view of still another example airborne particle reduction structure.

DETAILED DESCRIPTION

Figure 1:
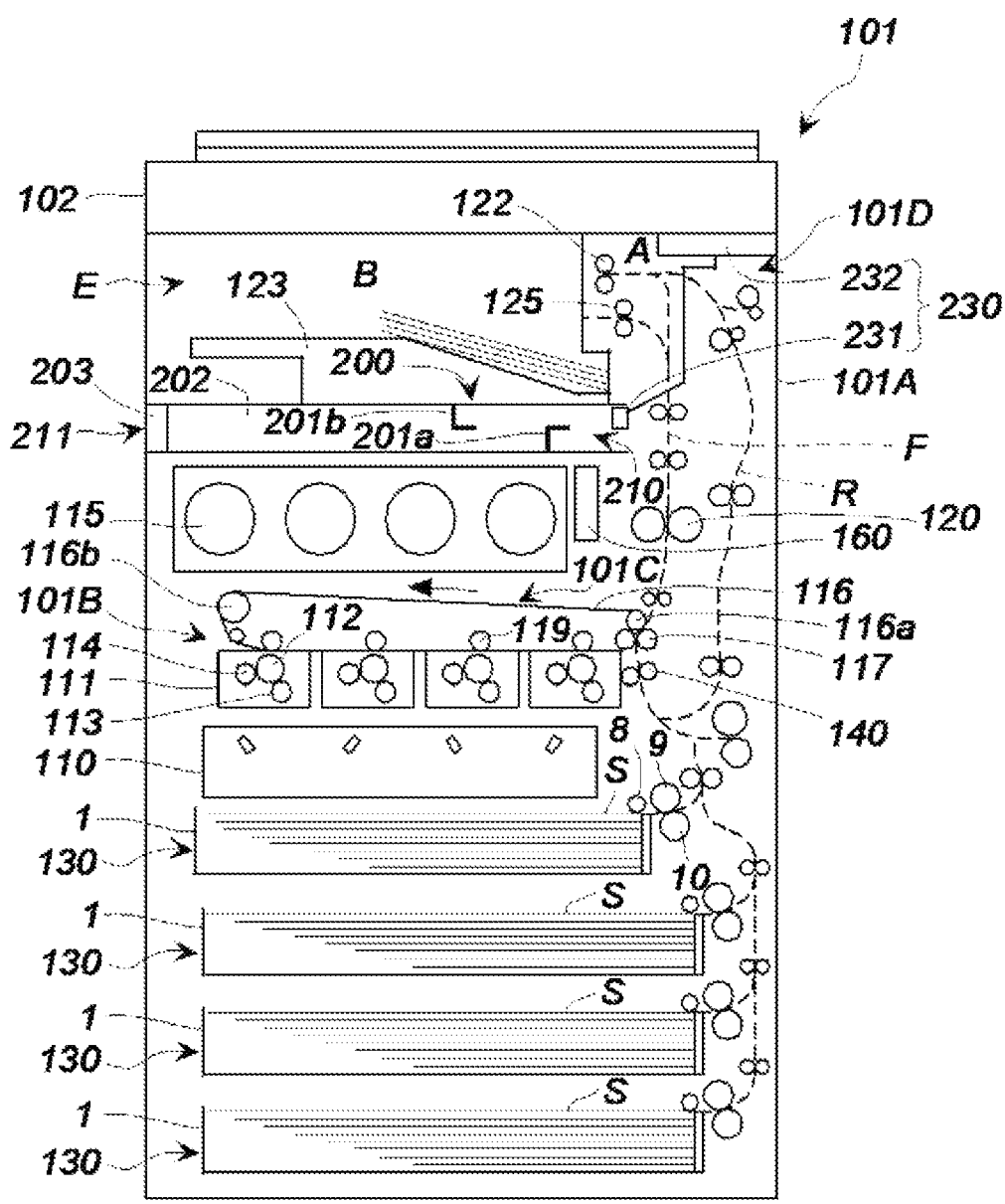
FIG. 1 is a schematic diagram illustrating an example image forming apparatus.

An image forming apparatus including an airborne particle reduction structure may be configured to reduce airborne particles without using air filters or the like that require maintenance. Particles retained within the image forming apparatus can be a cause of image forming failure. For example, when adhered to an exposure device such as a laser light transmitter, the particles may cause image failure. Also, the particles may cause such inconveniences as image control failure or contact failure when adhered to electric components, and may cause transport failure of transfer materials when adhered to a rubber transport roller for transporting transfer sheets, resulting in lower productivity. Such respective issues attributable to airborne particles tend to become more prominent due to increase in productivity and downsizing of image forming apparatuses.

An example image forming apparatus may include, in an airflow passage for airstream, an airborne particle reduction structure provided with at least a first L-shaped baffle and a second L-shaped baffle. The first L-shaped baffle and the second L-shaped baffle may each include an overhang extending from a flexure (e.g., a bent or curved portion of the baffle) to one end (e.g., a first end of the baffle) and a wind receiver extending from the flexure to the other end (e.g., a second end of the baffle). One end of the first L-shaped baffle and one end of the second L-shaped baffle may be oriented upstream or toward an upstream position of the airflow passage, the other end (e.g., second end) of the first L-shaped baffle may be attached to a first airflow surface of the airflow passage, and the other end (e.g., second end) of the second L-shaped baffle may be attached to a second airflow surface opposing the first airflow surface downstream from the first L-shaped baffle. With the provision of the airborne particle reduction structure, the image forming apparatus can reduce airborne particles generated within the image forming apparatus.

Such image forming apparatus may be a copier or multifunction machine, or any of other machines employing an electrophotographic system. For example, the imaging forming apparatus may be a printer, a component of an imaging system, or an imaging system. Additionally, the imaging forming apparatus may comprise a developing device used in an imaging system or the like. Further, any part within the image forming apparatus through which airstream flows can be considered an airflow passage in some examples, such that the airborne particle reduction structure can be disposed therein and airborne particles within the image forming apparatus can be reduced thereby.

In some example image forming apparatuses, the first L-shaped baffle and the second L-shaped baffle may each have a projection area of approximately 45 to 90%, and in some examples approximately 55 to 80%, of the cross sectional area of an air passing portion of the airflow passage in a front view from the upstream. Additionally, the length of the overhang of each of the first L-shaped baffle and the second L-shaped baffle may be approximately 85 to 120%, and in some examples approximately 95 to 110%, of the height of the wind receiver from the airflow surface. Further, the distance between the flexure of the wind receiver of the first L-shaped baffle and the flexure of the wind receiver of the second L-shaped baffle may be approximately 1.8 to 2.5 times, and in some examples approximately 2.0 to 2.3 times the height of the wind receiver of the first L-shaped baffle from the airflow surface. These ranges may be selected from the viewpoint of effectively reducing airborne particles. Further, in some examples, a transport passage for transfer materials may also serve as the airflow passage, and the image forming apparatus may be provided with a pair of mutually opposing side plates respectively abutting against side edges of the first L-shaped baffle and side edges of the second L-shaped baffle.

In some examples, the image forming apparatus may further include a third L-shaped baffle disposed downstream from the second L-shaped baffle. The third L-shaped baffle may comprise at least an overhang extending from a flexure to one end and a wind receiver extending from the flexure to the other end; the one end of the third L-shaped baffle may be oriented upstream or toward an upstream position of the airflow passage, and the other end of the third L-shaped baffle may be attached to the first airflow surface. Further, the third L-shaped baffle may have a projection area of 45 to 90%, and in some examples approximately 55 to 80%, of the cross sectional area of the air passing portion of the airflow passage in a front view from the upstream, and the length of the overhang of the third L-shaped baffle may be approximately 85 to 120%, and in some examples approximately 95 to 110%, of the height of the wind receiver from the airflow surface. With the further provision of the third L-shaped baffle, the image forming apparatus can further reduce airborne particles generated within the image forming apparatus. Further, in some examples, a transport passage for transfer materials may also serve as the airflow passage, and the image forming apparatus may be provided with a pair of mutually opposing side plates respectively abutting against the side edges of the first L-shaped baffle, the side edges of the second L-shaped baffle, and side edges of the third L-shaped baffle.

The image forming apparatus may further include a water vapor generator for mixing water vapor with the airstream. With this, airborne particles generated within the image forming apparatus can be reduced more effectively. Then, in cases where an electrophotographic image forming apparatus is selected as the image forming apparatus, a fixing device for fixing a developer onto a transfer material under heat and pressure may also serve the role of the water vapor generator and the transport passage for transfer materials may also serve as the airflow passage. Further, a rate of supplying water vapor from the water vapor generator may be approximately 0.20 to 0.50 mg/min per 1 cm$^2$ of the cross sectional area of the air passing portion of the airflow passage.

An example method for reducing airborne particles in airstream passing through an airflow passage may be performed by an image forming apparatus including two or more L-shaped baffles each having an overhang and a wind receiver are alternately disposed on mutually opposing airflow surfaces in the airflow passage for producing, in the airstream passing through the airflow passage, a deceleration region formed between acceleration regions and at least one or more vortex flows in the deceleration region. In some examples, airborne particles in the airstream can be adhered and captured at the airflow surfaces of the airflow passage, and the overhangs and wind receivers of the L-shaped baffles. By producing the deceleration region formed between the acceleration regions in the airstream passing through the airflow passage, and by producing the at least one or more vortex flows in the deceleration region, the method can reduce airborne particles in the airstream passing through the airflow passage.

According to another example method, a plurality of vortex flows having different rotation directions may be produced in the deceleration region for effectively reducing airborne particles in the airstream. Further, water vapor may be mixed with the airstream. The water vapor may be supplied from a water vapor generator and a rate of supplying water vapor from the water vapor generator may be 0.20 to 0.50 mg/min per 1 cm$^2$ of the cross sectional area of the air passing portion of the airflow passage. By mixing water vapor with the airstream, the method can reduce airborne particles in the airstream more effectively.

In the following description, with reference to the drawings, the same reference numbers are assigned to the same components or to similar components having the same function, and overlapping description is omitted. Additionally, the size, material and shape of components, as well as their relative arrangements and the like may be modified as appropriate.

FIG. 1 illustrates, as an example image forming apparatus, a schematic construction of a multifunction color machine. Indicated at 101 is a full-color laser beam printer (hereinafter referred to as "printer") illustrated as an example image forming apparatus, 101A is a printer body (machine body), or an image forming machine body, and 101B is an image forming section to form images on sheets. Indicated at 102 is an image reader disposed substantially horizontally on the top of the printer body 101A, and a discharge space E for discharging sheets is formed between the image reader 102 and the printer body 101A.

Indicated at 130 is a sheet feeding device including a paper feed cassette 1, i.e., a sheet container attachably disposed in the printer body 101A and containing sheets S, for feeding sheets S from the paper feed cassette 1. The sheet feeding device 130 includes, for example, a pickup roller 8 to serve as a sheet feeder, and a separator having a feed roller 9 and a retard roller 10 for separating sheets S delivered from the pickup roller 8.

For example, the image forming section 101B employs a four-drum full-color system and is provided with a laser scanner 110 and four process cartridges 111 to form toner images of four colors, i.e., yellow (Y), magenta (M), cyan (C) and black (K). Each of the process cartridges 111 may comprise, for example, a photosensitive drum 112, a charting unit or charger 113, and a developing unit or developing device 114. The image forming section 101B may also include, for example, an intermediate transfer unit 101C disposed above the process cartridges 111, and a fixing unit 120. Indicated at 115 is a toner cartridge for supplying toners to the developing devices 114.

The intermediate transfer unit 101C may include, for example, an intermediate transfer belt 116 wrapped around a driver roller 116a and a tension roller 116b. Primary transfer rollers 119 are disposed inside the intermediate transfer belt 116 and abut against the intermediate transfer belt 116 at positions opposing the photosensitive drums 112. The intermediate transfer belt 116 may rotate in the direction of an arrow, for example, by the driver roller 116a driven by a driving unit.

Then, with the primary transfer rollers 119, respective color images on the photosensitive drums are successively overlappingly transferred onto the intermediate transfer belt 116. A secondary transfer roller 117 for transferring, for example, a color image formed on the intermediate transfer belt to a sheet S, is disposed at a position opposing the driver roller 116a of the intermediate transfer unit 101C. Further, the fixing unit 120 is arranged above the secondary transfer roller 117, and a discharge roller pair 125 and a side reversing unit 101D are arranged, for example, above the fixing unit 120. The side reversing unit 101D may include a reversibly rotatable reverse roller pair 122 and a re-transport passage R for once again transporting a sheet, which is formed with image on one side thereof, to the image forming section 101B. In FIG. 1, indicated at 160 is a controller (operating unit) for controlling image forming operations, sheet feeding operations and others.

Next, an example image forming operation of the printer 101 is described. First, upon reading image information from a document, the image information is subjected to image processing and thereafter converted to electric signals to be transmitted to the laser scanner 110 of the image forming section 101B. In the image forming section 101B, the surfaces of the photosensitive drums 112, which are uniformly charged with the chargers 113 to a predetermined polarity and potential, are successively exposed by laser light. Thereby, yellow, magenta, cyan and black electrostatic latent images are successively formed, for example, on the photosensitive drums of the process cartridges 111.

After that, the electrostatic latent images may be developed and visualized, using color toners charged to a negative polarity, and the respective toner images on the photosensitive drums may be successively overlapped and transferred onto the intermediate transfer belt 116, with the aid of a primary transfer bias (for example, 20 μA/+1.5-2 kV) of a positive polarity applied to the primary transfer rollers 119. Toner images are thereby formed on the intermediate transfer belt 116. In parallel with the toner image forming operation, a sheet S is delivered by the pickup roller 8 mounted to the sheet feeding device 130. The delivered sheet S, which is separated one by one via the separator having the feed roller 9 and the retard roller 10, may be transported to a registration roller pair 140, and skewing may be corrected with the registration roller pair 140.

After being corrected for skewing, the sheet S may be transported to the secondary transfer section by the registration roller pair 140, and the toner images are collectively transferred onto the sheet S in the secondary transfer section, with the aid of a secondary transfer bias (for example, 30 µA/+1 kV) applied to the secondary transfer roller 117. Next, the sheet S bearing the transferred toner images is transported to the fixing unit 120, at which fixing unit 120 the color toners are melted and mixed under heat and pressure, and fixed onto the sheet S in the form of color image.

After that, the sheet S bearing the fixed image is discharged to the discharge space E by, for example, the discharge roller pair 125 disposed downstream from the fixing unit 120, and stacked on a stacker 123 protruding from the bottom of the discharge space E. Indicated at F is a transport passage for transfer materials between the fixing unit 120 and the discharge roller pair 125, through which a sheet S formed with a completed image is transported. If images are to be formed on both sides of the sheet S, after having been fixed with the image, the sheet S is transported by the reverse roller pair 122 to the transfer material reversal passage R, and once again transported to the image forming section 101B.

As illustrated in FIG. 1, an example airborne particle reduction structure 200 disposed below the stacker 123 may include, within an airflow duct 202, a first L-shaped baffle 201a and a second L-shaped baffle 201b.

The airborne particle reduction structure 200 may include in the vicinity of an inlet of the airflow duct 202 a water vapor generator 230 for supplying water vapor to airstream. The water vapor generator 230 may include a humidifying device 231 and a water supply tank 232 coupled to the humidifying device 231. The inlet 210 of the airflow duct 202 may be disposed, for example, in the vicinity of the fixing unit 120. Additionally, an outlet 211 of the airflow duct 202 may be provided with an axial flow blower 203. The air in the space around the fixing unit 120 and in the space consecutive with that space may flow, in response to the operation of the axial flow blower 203, from the inlet 210 to the outlet 211 via the first L-shaped baffle 201a and the second L-shaped baffle 201b.

Figure 2:
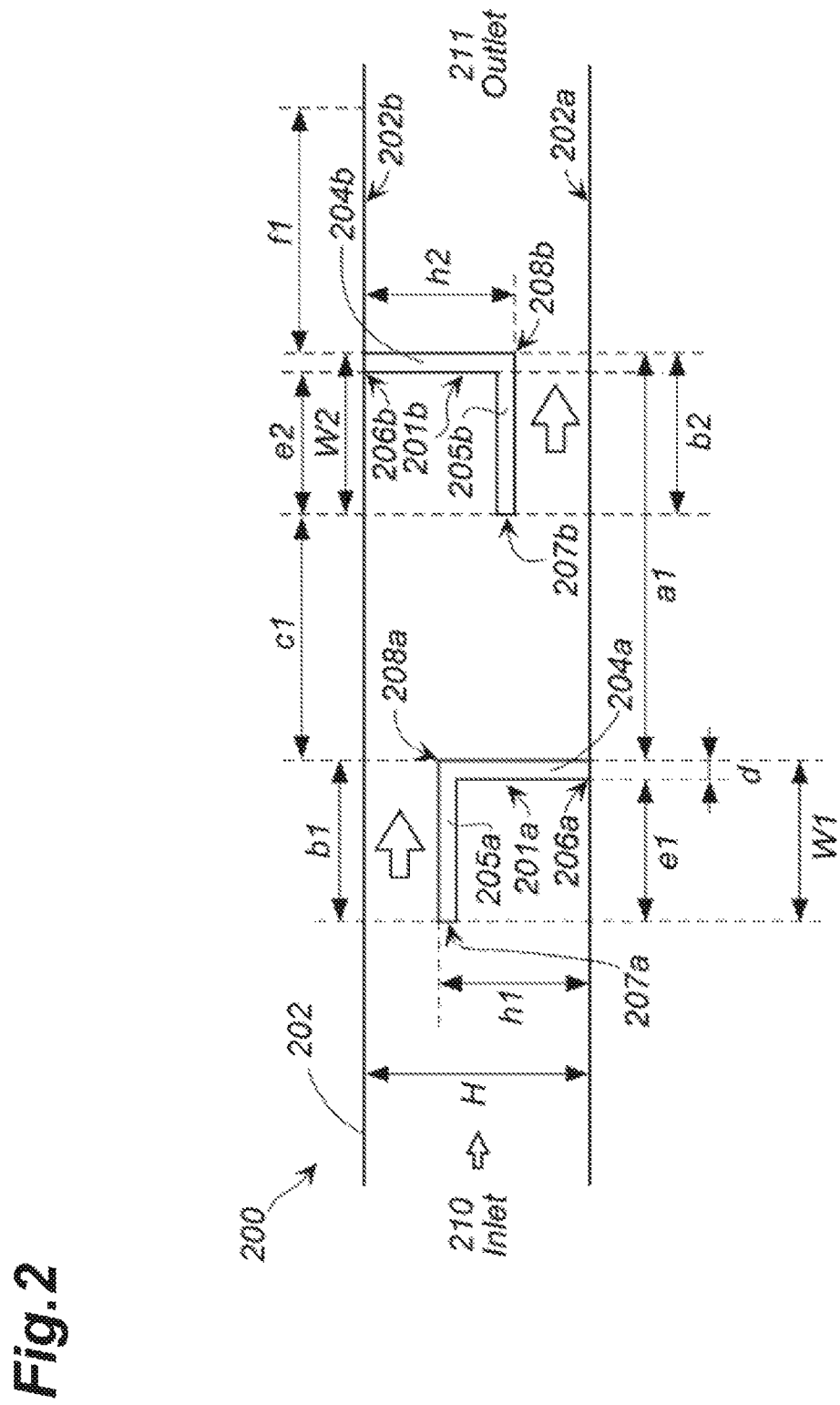
FIG. 2 is a cross sectional view of an example airborne particle reduction structure.

The airflow duct 202, as well as the first L-shaped baffle 201a and the second L-shaped baffle 201b are now further described in relation to FIG. 2. FIG. 2 illustrates a cross section (hereinafter referred to as "longitudinal cross section" for convenience) of the airborne particle reduction structure 200 taken through a plane parallel with the flowing direction of airstream. In some examples, the airflow duct 202 is illustrated as having a rectangular cross section. However, the cross section of the airflow duct 202 is not limited to a rectangle and various shapes such as circle and ellipse may also be used.

In some examples, the first L-shaped baffle 201a is disposed within the airflow duct 202 and the second L-shaped baffle 201b is disposed downstream from the first L-shaped baffle 201a. The first L-shaped baffle 201a and the second L-shaped baffle 201b have, for example, the shape of letter L in a longitudinal cross section. Additionally, the first L-shaped baffle 201a has, for example, an overhang 205a, which is a horizontal portion extending from a flexure 208a to one end 207a, and a wind receiver 204a, which is a vertical portion extending from the flexure 208a to the other end 206a. The wind receiver 204a may be disposed, for example at the other end 206a, vertically to an airflow surface 202a of the airflow duct 202. The one end 207a of the first L-shaped baffle 201a may be oriented upstream or toward an upstream position of the airflow duct 202. The second L-shaped baffle 201b also has, for example, an overhang 205b, which is a horizontal portion extending from a flexure 208b to one end 207b, and a wind receiver 204b, which is a vertical portion extending from the flexure 208b to the other end 206b. The wind receiver 204b may be disposed, for example at the other end 206b, vertically to an airflow surface 202b of the airflow duct 202, and the one end 207b of the first L-shaped baffle 201b is oriented upstream or toward an upstream position of the airflow duct 202. The first L-shaped baffle 201a and the second L-shaped baffle 201b may respectively make contact with other airflow surfaces which are perpendicular to the airflow surface 202a and the airflow surface 202b of the airflow duct 202 (e.g., corresponding to lateral surfaces of the airflow duct).

In FIG. 2, the height h1 of the first L-shaped baffle 201a from the airflow surface 202a may be adjusted such that the projection area in a front view from the upstream of the airflow duct 202 is, for example, approximately 45 to 90%, and in some examples approximately 55 to 80%, of the cross sectional area of an air passing portion of the airflow passage 202. Further, the length w1 of the overhang 205a may have a length of approximately 85 to 120%, and in some examples approximately 95 to 110%, of the height h1. Likewise, the second L-shaped baffle 201b may be adjusted such that the height h2 of the wind receiver 204b from the airflow surface 202b has a projection area of approximately 45 to 90%, and in some examples approximately 55 to 80%, of the cross sectional area of an air passing portion of the airflow passage 202, in a front view from the upstream of the airflow duct 202. Further, the length w2 of the overhang 205b may have a length of approximately 85 to 120%, and in some examples approximately 95 to 110%, of the height h2. The distance of separation a1 between the flexure 208a of the first L-shaped baffle 201a and the flexure 208b of the second L-shaped baffle 201b may be approximately 1.8 to 2.5 times, and in some examples approximately 2.0 to 2.3 times the height h1 of the first L-shaped baffle 201a.

Figure 5:
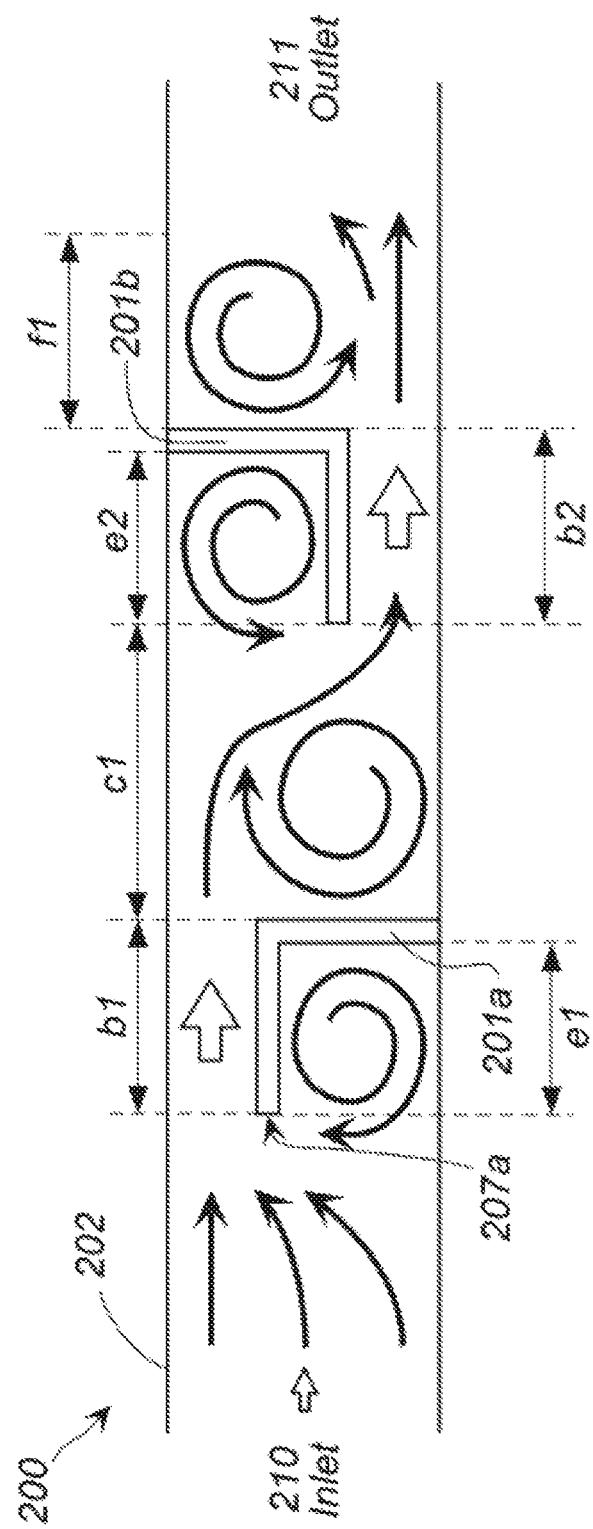
FIG. 5 is a schematic diagram of state of airstream flowing through an example airborne particle reduction structure.

Next, an example operation of the airborne particle reduction structure 200 is described. In response to the operation of the axial flow blower 203, air containing airborne particles generated in the image forming apparatus forms airstream that proceeds into the inlet 210. Part of the airstream is blocked from flowing by the first L-shaped baffle 201a, and a deceleration region e1 is produced in an area encompassed with the first L-shaped baffle 201a. A vortex flow may be produced in the deceleration region e1. Further, airstream passing through a flow path (acceleration region b1) narrowed by the overhang 205a of the first L-shaped baffle 201a may be accelerated, while being rectified by the overhang 205a. Then, if the length w1 of the overhang 205a is less than 85% of the height h1 of the wind receiver 204a, the overhang 205a may not be unable to sufficiently rectify and accelerate the airstream, and also may have difficulty in maintaining the later-described spatial volume of the deceleration region, and the vortex flow produced in the deceleration region may become insufficient. Part of the accelerated airstream is once again blocked from flowing by the second L-shaped baffle 201b disposed to a surface opposite to that of the first L-shaped baffle 201a. As a result, a deceleration region c1e2 is created, comprising the region c1 in FIG. 2 and a region e2 connected to the region c1 and encompassed with the second L-shaped baffle 201b. Vortex flows are produced in the region c1 and the region e2, respectively. Further airstream passing through a flow path (acceleration region b2) narrowed by the overhang 205b of the second L-shaped baffle 201b may produce a deceleration region f1 downstream from the second L-shaped baffle 201b, while being directed toward the outlet 211. A vortex flow may be produced in the deceleration region f1. For example, the rotation direction of the vortex flow produced in the region c1 may be opposite to the direction rotation of the vortex flow produced in the region e2 (see FIG. 5). It should be noted that FIG. 5 illustrates an airstream in the airborne particle reduction structure schematically, and it is to be understood that the illustrated flows of the airstream may vary in number, direction, size, etc. in other examples. Airborne particles carried in the airstream may be circulated and/or retained in the vortex flows, and become aggregated by repeatedly colliding with each other to gradually increase in particle size (coarsening). As it may be difficult for the coarsened airborne particles to remain within the vortex flows, they tend to adhere to airflow surfaces of the airflow duct 202 in the deceleration region c1, as well as surfaces of the first L-shaped baffle 201a and the second L-shaped baffle 201b. As such, by circulating/retaining the airstream containing airborne particles for coarsening the airborne particles for adhesion onto the airflow surfaces of the airflow duct and L-shaped baffle surfaces, airborne particles resident in the air proceeding into the inlet 210 can be reduced by the airborne particle reduction structure 200 according to the present disclosure.

In some example airborne particle reduction structures, the one end 207a of the first L-shaped baffle 201a and the one end 207b of the second L-shaped baffle 201b are directed upstream or toward an upstream position of the airstream. In some examples, when neither of the one end 207a and the one end 207b are directed upstream of the airstream, vortex flows may not be readily formed in the deceleration region c1e2 and the aforementioned effect of reducing airborne particles may not be readily attained.

The airflow duct 202, the first L-shaped baffle 201a and the second L-shaped baffle 201b may be made of a material such as, for example, a thermoplastic resin, and they may be formed by way of injection molding. Further, to facilitate the adhesion of particles onto inner walls of the airflow duct and surfaces of the L-shaped baffles, the inner walls of the airflow duct and the surfaces of the L-shaped baffles may be subjected to a roughening treatment or fine processing. Further, the thicknesses of the wind receiver 204a and the overhang 205a of the first L-shaped baffle 201a, and the thicknesses of the wind receiver 204b and the overhang 205b of the second L-shaped baffle 201b may be, for example, approximately 0.5 to 2 mm. A thickness of the wind receiver 2014B of less than 0.5 mm may affect the mold processing or strength of structure. Further, a thickness of the wind receiver 2014B of greater than 2 mm may affect the ability to selectively control the pressure and sizing of the apparatus.

The airborne particle reduction structure 200 is provided with two L-shaped baffles, i.e., the first L-shaped baffle 201a and the second L-shaped baffle 201b, but the effect of reducing airborne particles can be further enhanced by appropriately additionally disposing L-shaped baffles having the same structure. For example, an airborne particle reduction structure 300 of FIG. 3 has a construction wherein, in addition to the first L-shaped baffle 201a and the second L-shaped baffle 201b, a third L-shaped baffle 201c is disposed on the airflow surface 202a opposing the airflow surface 202b downstream from the second L-shaped baffle 201b.

The third L-shaped baffle 201c has, for example, an overhang 205c, which is a horizontal portion extending from a flexure 208c to one end 207c, and a wind receiver 204c, which is a vertical portion extending from the flexure 208c to the other end 206c. The wind receiver 204c may be disposed, for example at the other end 206c, vertically to the airflow surface 202a of the airflow duct 202. In some examples, the one end 207c of the first L-shaped baffle 201c is oriented upstream or toward an upstream position of the airflow duct 202. In the same manner as the first L-shaped baffle 201a and the second L-shaped baffle 201b, the third L-shaped baffle 201c may also make contact with other airflow surfaces which are perpendicular to the airflow surface 202a and the airflow surface 202b of the airflow duct 202 (e.g., corresponding to lateral surfaces of the airflow duct).

As in the first L-shaped baffle or the second L-shaped baffle, the height h3 of the third L-shaped baffle 201c from the airflow surface 202a may be adjusted, such that the projection area in a front view from the upstream of the airflow duct 202 is, for example, approximately 45 to 90%, and in some examples approximately 55 to 80%, of the cross sectional area of an air passing portion of the airflow passage 202. Further, the length w3 of the overhang 205c may have a length of approximately 85 to 120%, and in some examples approximately 95 to 110%, of the height h3. Further, the distance of separation a2 between the flexure 208b of the second L-shaped baffle 201b and the flexure 208c of the third L-shaped baffle 201c may be approximately 1.8 to 2.5 times, and in some examples approximately 2.0 to 2.3 times the height h1 of the first L-shaped baffle 201a.

Figure 3:
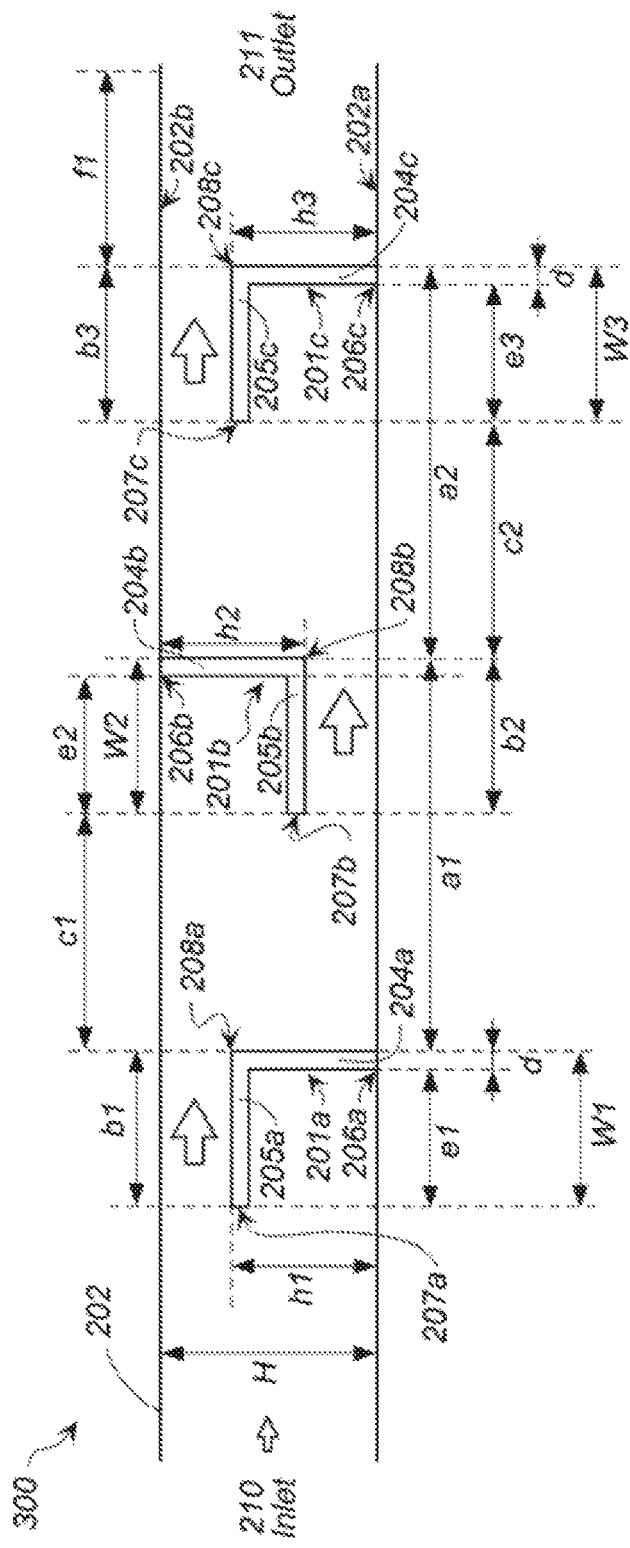
FIG. 3 is a cross sectional view of another example airborne particle reduction structure.

In the example airborne particle reduction structure 300 illustrated in FIG. 3, in addition to the airstream acceleration regions b1 and b2 and deceleration region c1e2 formed in the airborne particle reduction structure 200 (FIG. 2), a deceleration region c2e3 including a region e3 connected to a region c2 and encompassed with the third L-shaped baffle 201c, and an acceleration region b3 are created. Vortex flows are produced in the region c2 and the region e3, respectively. Vortex flows are produced in the deceleration region c2e3, as in the deceleration region c1e2. However, the rotation direction of the vortex flow produced in the region c2 may be opposite to the direction rotation of the vortex flow produced in the region c1. Due to the vortex flows produced in the deceleration region c2e3, airborne particles carried in the airstream may become aggregated and adhere to airflow surfaces of the airflow duct 202, as well as surfaces of the second L-shaped baffle 201b and the third L-shaped baffle 201c, as described above in connection with the deceleration region c1. Consequently, the airborne particle reduction structure 300 (FIG. 3) may further reduce airborne particles carried in the air, than in the case of the airborne particle reduction structure 200 (FIG. 2). Four or more L-shaped baffles can be provided for reducing airborne particles still further, and such may be appropriately selected in consideration of the size of the image forming apparatus, efficiency of exhaustion, etc.

In some examples, the airborne particle reduction structure 200 or 300 was described as being provided with the airflow duct 202. However, other example airborne particle reduction structures may not be provided with such airflow duct. For example, an airflow duct may be a space in the image forming apparatus through which air within the apparatus may flow, and such space may be referred to as an airflow passage. In some examples, the transport passage (F in FIG. 1) for a transfer material formed with a completed image may also serve as such an airflow passage.

FIG. 4 illustrates an example airborne particle reduction structure in the case where the transport passage (F in FIG. 1) also serves as an airflow passage. FIG. 4(a) is a simplified diagram in a view direction in which a sheet S moving through the transport passage is seen from the front, and FIG. 4(b) is a simplified side view thereof. The transport passage occupies a certain volume of space and communicates with the interior of the image forming apparatus. FIG. 4 illustrates an example airborne particle reduction structure 400 in such space. In FIGS. 4(a) and (b), for example, with the aid of an axial flow blower, the air in the image forming apparatus may flow as airflow illustrated by a blank arrow and can be discharged to outside the image forming apparatus.

In FIG. 4(b), a sheet S formed with a completed image (illustrated in dotted lines) may proceed in the direction of the arrow, along a guide plate 401. With the movement of the sheet S, the air in the vicinity of the surface of the sheet S may also move in the direction of the arrow. The airborne particle reduction structure 400 is provided with a first L-shaped baffle 201a and a second L-shaped baffle 201b, for example as described above in connection with FIG. 2. Also, the airborne particle reduction structure 400 is further provided with a pair of mutually opposing side plates 403a and 403b respectively abutting against side edges 210a and 211a of the first L-shaped baffle 210a and side edges 210b and 211b of the second L-shaped baffle 201b. The side plate 403a may be located in the vicinity of the sheet S and on the opposite side of the guide plate 401 across the sheet S. The side plate 403b may be located to oppose the side plate 403a across the first L-shaped baffle 201a and the second L-shaped baffle 201b. In the direction of movement of the sheet S, the side plates 403a and 403b may have a length suitably accommodated in the space of the transport passage. Further, the above airborne particle reduction structure 400 may also be provided with a third L-shaped baffle 201c as illustrated in FIG. 3, and the third L-shaped baffle 201c may have a relation in position as described above in connection with FIG. 3.

As illustrated in FIG. 4(a), the airborne particle reduction structure 400 may be installed by connecting side edges 404a and 404b of the side plate 403a, side edges 405a and 405b of the side plate 403b, the other end 206a of the first L-shaped baffle 201a and the other end 206b of the second L-shaped baffle 201b to component walls 410 and 420, respectively, of the image forming apparatus. For example, the component wall 410 may be a rib or frame of the image forming apparatus. Further, the component wall 420 may be a door or the like for maintenance provided in the front of the image forming apparatus. Where the component wall 420 is a door, the airborne particle reduction structure 400 may not be connected to the door. In this case, the airborne particle reduction structure 400 may be adapted to make contact with the door.

The airborne particle reduction structure 200 may further reduce airborne particles carried in the airstream when the water vapor generator 230 is provided to supply water vapor to the airstream in the vicinity of the inlet of the airflow duct 202. The inclusion of water vapor in the airstream may help facilitate the coarsening of airborne particles in the airstream, and the adherence to airflow surfaces of the airflow duct, surfaces of the L-shaped baffles and other surfaces.

Figures 6A, 6B:
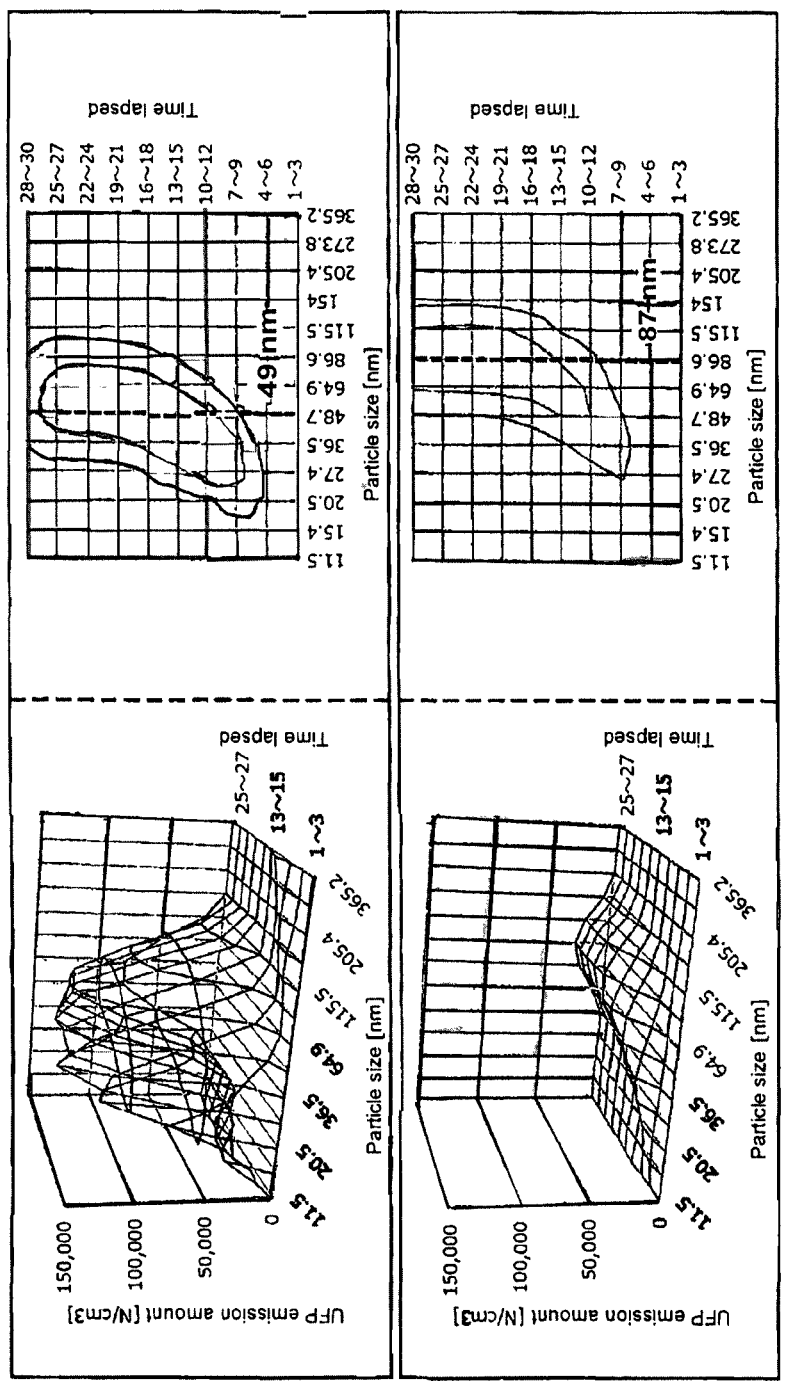
FIG. 6 illustrates graphs depicting the effect of an example airborne particle reduction structure.

The humidifying device 231 applicable to the water vapor generator 230 may include a small humidifying device of steam type, ultrasonic type, atomization (heaterless) type or hybrid type. Further, when the image forming apparatus is an electrophotographic type, a heat and pressure fixing device disposed in the image forming apparatus may be used as the water vapor generator 230. In some examples, moisture contained in the transfer material vaporizes at the fixing unit 120. Thereby, the image forming apparatus may not include the water supply tank 232 and/or the humidifying device 231.

A rate of supplying water vapor from the water vapor generator 230 to the vicinity of the inlet of the airflow duct 202 may be approximately 0.20 to 0.50 mg/min per 1 $cm^2$ of the cross sectional area of the airflow duct through which the airstream flows. If the rate of supplying water vapor is less than 0.20 mg/min, the effect of supplying water vapor may not be sufficient and, if it exceeds 0.50 mg/min, dew condensation may occur inside the airflow duct 202.

In some examples, the rate of supplying water vapor may be defined as a value obtained by dividing a transpiration amount of water supplied to the humidifying device by an operating time of the humidifying device. Further, when a fixing device also serves as the humidifying device, a value obtained by dividing a moisture content of transfer material, which is lost during passage through the fixing device, by a printing time may be used as the rate of supplying water vapor. The moisture content of transfer material, which is lost during passage through the fixing device, may be calculated beforehand from a moisture content of an unused transfer material and a moisture content of the transfer material immediately after passing through the fixing device without bearing any image (e.g., solid white). The moisture content of transfer material may be measured with, for example, a resistance-type paper moisture sensor HK-300 available from KETT Electric Laboratory.

When a fixing device is also used as a humidifying device, a humidifying rate can be adjusted by way of a heating temperature of the fixing device, and the humidifying rate may be increased by increasing the heating temperature. For example, when a temperature/humidity sensor is mounted beforehand in an upstream part of airstream, the supply rate of water vapor supplied to the airflow duct 202 can be automatically adjusted without depending on the type of transfer material and the moisture content thereof. In some examples, the airstream may be introduced into the airflow duct 202 for calculating an absolute moisture content from measurements of the temperature/humidity sensor to be fed back to a heater controller of the fixing device.

The inventors have modified a commercially available electrophotographic multifunction color machine and installed the airborne particle reduction structure 200 (see FIG. 1) for studying the state of emission of airborne particles, so as to quantitatively demonstrate the effect of the aforementioned airborne particle reduction structure. The airborne particle reduction structure 200 used in this study was verified in advance by visualization observation with laser sheet irradiation that, when aerosol is mixed in airstream and passed in the same rate as the multifunction color machine, a deceleration region sandwiched between acceleration region is formed within the airflow duct 202 and vortex flows having different rotation directions are produced at two locations in the deceleration region. As an emission amount of airborne particles, the number of particles emitted per 10 minutes of printing was calculated in accordance with a method described in Appendix S-M to RAL-UZ 171 of Germany. A compact SMPS (Scanning Mobility Particle Sizer) of TSI, Inc. (Model 3910) was used for measuring changes in number of airborne particles.

The results show that, while the amount of emission of airborne particles was $12\times10^{11}$ before the modification (before installing the airborne particle reduction structure 200), the emission amount of airborne particles was reduced to $1.9\times10^{11}$ after the installation of the airborne particle reduction structure 200 (reduction rate; 84%). A comparison of particle size profiles of airborne particles emitted during the measurements shows that, while airborne particles emitted before the modification had an average particle diameter of 49 nm (FIG. 6(a)), the average particle diameter of emitted airborne particles was coarsened to 87 nm (FIG. 6(b)) after the modification.

Further, when the airborne particle reduction structure 200 was replaced by installing the airborne particle reduction structure 300, the emission amount of airborne particles was reduced to $1.5\times10^{11}$ (reduction rate; 88%). As such, it has been confirmed that, with the airborne particle reduction structure provided with a plurality of L-shaped baffles, airborne particles emitted from the image forming apparatus can be reduced without using air filters or the like that require maintenance.

It is to be understood that not all aspects, advantages and features described herein may necessarily be achieved by, or included in, any one particular example. Indeed, having described and illustrated various examples herein, it should be apparent that other examples may be modified in arrangement and detail is omitted.

The invention claimed is:

1. An image forming apparatus, comprising:

an airborne particle reduction structure located in an airflow passage and including a first L-shaped baffle and a second L-shaped baffle, wherein the first L-shaped baffle and the second L-shaped baffle each include an overhang extending from a bent portion to a first end, and a wind receiver extending from the bent portion to a second end, wherein the first end of the first L-shaped baffle and the first end of the second L-shaped baffle are both oriented toward an upstream position of the airflow passage, wherein the second end of the first L-shaped baffle is attached to a first airflow surface of the airflow passage, wherein the second end of the second L-shaped baffle is attached to a second airflow surface opposing the first airflow surface and located downstream from the first L-shaped baffle, and wherein the first L-shaped baffle and the second L-shaped baffle each has a projection area of 45 to 90% of a cross sectional area of an air passing portion of the airflow passage when viewed from the upstream position, and wherein a length of the overhang of each of the first L-shaped baffle and the second L-shaped baffle is 85 to 120% of a height of the wind receiver as measured from the first airflow surface and the second airflow surface, respectively.

2. The image forming apparatus according to claim 1, wherein the distance between the bent portion of the first L-shaped baffle and the bent portion of the second L-shaped baffle is 1.8 to 2.5 times the height of the wind receiver of the first L-shaped baffle as measured from the first airflow surface.

3. The image forming apparatus according to claim 2, wherein the airflow passage comprises a transport passage to transfer materials, the transport passage including a pair of mutually opposing side plates abutting against side edges of the first L-shaped baffle and side edges of the second L-shaped baffle.

4. The image forming apparatus according to claim 1, comprising a third L-shaped baffle disposed downstream from the second L-shaped baffle, wherein the third L-shaped baffle has an overhang extending from a bent portion of the third L-shaped baffle to a first end of the third L-shaped baffle, and a third wind receiver extending from the bent portion of the third L-shaped baffle to a second end of the third L-shaped baffle, wherein the first end of the third L-shaped baffle is oriented toward the upstream position of the airflow passage, and wherein the second end of the third L-shaped baffle is attached to the first airflow surface.

5. The image forming apparatus according to claim 4, wherein the third L-shaped baffle has a projection area of 45 to 90% of a cross sectional area of an air passing portion of the airflow passage when viewed from the upstream position, and wherein the length of the overhang of the third L-shaped baffle is 85 to 120% of a height of the third wind receiver as measured from the first airflow surface.

6. The image forming apparatus according to claim 4, wherein the airflow passage comprises a transport passage to transfer materials, the transport passage including a pair of mutually opposing side plates abutting against side edges of the first L-shaped baffle, side edges of the second L-shaped baffle, and side edges of the third L-shaped baffle.

7. The image forming apparatus according to claim 1, comprising a water vapor generator to mix water vapor with an airstream that is transported in the airflow passage.

8. The image forming apparatus according to claim 7, wherein a rate of supplying water vapor from the water vapor generator is 0.20 to 0.50 mg/min per 1 $cm^2$ of a cross sectional area of an air passing portion of the airflow passage.

9. The image forming apparatus according to claim 7, wherein the image forming apparatus comprises an electrophotographic image forming apparatus, and wherein the water vapor generator comprises a fixing device to fix a developer onto a transfer material under heat and pressure.

10. The image forming apparatus according to claim 1, further comprising an axial blower located at one end of the airflow passage.

11. The image forming apparatus according to claim 1, wherein the first L-shaped baffle and the second L-shaped baffle each includes a thermoplastic resin.

12. The image forming apparatus according to claim 1, wherein a thickness of the overhang and a thickness of the wind receiver of each of the first L-shaped baffle and the second L-shaped baffle is between 0.5 mm and 2.0 mm.

13. A method for reducing airborne particles, comprising:

producing, in an airstream passing through an airflow passage, a deceleration region formed between acceleration regions and one or more vortex flows in the deceleration region, wherein a plurality of L-shaped baffles each having an overhang and a wind receiver are alternately disposed on mutually opposing airflow surfaces in the airflow passage;

coarsening the airborne particles in the airstream, as a result of producing the deceleration region; and reducing the airborne particles in the airstream by adhering and capturing coarsened airborne particles at the airflow surfaces of the airflow passage, at each overhang, and at each wind receiver, wherein each of the plurality of L-shaped baffles has a projection area of 45 to 90% of a cross sectional area of an air passing portion of the airflow passage when viewed from an upstream position, and wherein a length of the overhang of each of the plurality of L-shaped baffles is 85 to 120% of a height of the wind receiver as measured from the airflow surface on which each L-shaped baffle is respectively disposed.

14. The method according to in claim 13, wherein a plurality of vortex flows having different rotational directions are produced in the deceleration region.

15. The method according to claim 13, comprising mixing water vapor with the airstream.

16. The method according to claim 15, comprising supplying the water vapor from a water vapor generator at a rate of 0.20 to 0.50 mg/min per 1 $cm^2$ of a cross sectional area of an air passing portion of the airflow passage.

17. An image forming apparatus, comprising:

an airborne particle reduction structure located in an airflow passage and including a first L-shaped baffle and a second L-shaped baffle, wherein the first L-shaped baffle and the second L-shaped baffle each include an overhang extending from a bent portion to a first end, and a wind receiver extending from the bent portion to a second end, wherein the first end of the first L-shaped baffle and the first end of the second L-shaped baffle are both oriented toward an upstream position of the airflow passage, wherein the second end of the first L-shaped baffle is attached to a first airflow surface of the airflow passage, wherein the second end of the second L-shaped baffle is attached to a second airflow surface opposing the first airflow surface and located downstream from the first L-shaped baffle, and wherein the airflow passage comprises a transport passage to transfer materials, the transport passage including a pair of mutually opposing side plates abutting against side edges of the first L-shaped baffle and side edges of the second L-shaped baffle.

18. The image forming apparatus according to claim 17, wherein the first L-shaped baffle and the second L-shaped baffle each has a projection area of 45 to 90% of a cross sectional area of an air passing portion of the airflow passage when viewed from the upstream position, and wherein a length of the overhang of each of the first L-shaped baffle and the second L-shaped baffle is 85 to 120% of a height of the wind receiver as measured from the first airflow surface and the second airflow surface, respectively.

19. The image forming apparatus according to claim 18, wherein the distance between the bent portion of the first L-shaped baffle and the bent portion of the second L-shaped baffle is 1.8 to 2.5 times the height of the wind receiver of the first L-shaped baffle as measured from the first airflow surface.

\* \* \* \* \*